US012626565B2

(12) United States Patent
Loader et al.

(10) Patent No.: US 12,626,565 B2
(45) Date of Patent: May 12, 2026

(54) ELECTRONIC GAMING DEVICE WITH MULTIPLE DYNAMICALLY CONFIGURABLE FEATURES DEPENDENT ON GAME STATES

(71) Applicant: Aristocrat Technologies Australia Pty Limited, North Ryde (AU)

(72) Inventors: James Loader, Springfield (AU); Karen Kendall, Toongabbie (AU); Luke Ireland, Denistone (AU); Antoon Visser, Coogee (AU); Joshua Matos, Cordeaux Heights (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/516,178

(22) Filed: Nov. 21, 2023

(65) Prior Publication Data

US 2024/0087424 A1     Mar. 14, 2024

Related U.S. Application Data

(63) Continuation of application No. 17/388,894, filed on Jul. 29, 2021, now Pat. No. 11,861,985.

(30) Foreign Application Priority Data

Jul. 30, 2020  (AU) ................................ 2020902685
Sep. 15, 2020  (AU) ................................ 2020233655

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01); *G07F 17/3244* (2013.01)

(58) Field of Classification Search
CPC ............ G07F 17/3267; G07F 17/3213; G07F 17/3244; G06F 7/588
See application file for complete search history.

(56) References Cited

U.S. PATENT DOCUMENTS

| | | | |
|---|---|---|---|
| 5,833,537 | A | 11/1998 | Barrie |
| 5,947,820 | A | 9/1999 | Morro |

(Continued)

FOREIGN PATENT DOCUMENTS

| | | |
|---|---|---|
| AU | 2008202678 A1 | 2/2009 |
| AU | 2017279696 A1 | 7/2018 |
| WO | 2017205905 A1 | 12/2017 |

OTHER PUBLICATIONS

Australian Examination Report for App No. AU2019222868, dated May 22, 2020, 4 pages.

(Continued)

*Primary Examiner* — Jeffrey K Wong
(74) *Attorney, Agent, or Firm* — Weaver Austin Villeneuve & Sampson LLP

(57) ABSTRACT

A gaming device for dynamically configuring a composite feature game based on a first feature game and a second feature game. When the composite feature game is triggered, a game controller determines respective current states of a first feature game and a second feature game. The current state of the first feature game comprises a first unenhanced state that has a first unenhanced play characteristic and a first enhanced state that has a first enhanced play characteristic. The current state of the second feature game comprises a second unenhanced state that has a second unenhanced play characteristic and a second enhanced state that has a second unenhanced play characteristic. The game controller dynamically incorporates one of the first enhanced play characteristic and one of the second unenhanced play char- (Continued)

acteristic and the second unenhanced play characteristic into a composite play characteristic.

20 Claims, 8 Drawing Sheets

(56)                    References Cited

U.S. PATENT DOCUMENTS

| | | |
|---|---|---|
| D428,399 S | 7/2000 | Kahn |
| 6,097,390 A | 8/2000 | Marks |
| 6,287,194 B1 | 9/2001 | Okada |
| 6,364,765 B1 | 4/2002 | Walker |
| 6,428,412 B1 | 8/2002 | Anderson |
| 6,461,241 B1 | 10/2002 | Webb |
| 6,533,658 B1 | 3/2003 | Walker |
| 6,579,178 B1 | 6/2003 | Walker |
| 6,726,563 B1 | 4/2004 | Baerlocher |
| 7,175,527 B2 | 2/2007 | Bryant |
| D582,426 S | 12/2008 | Chen |
| 7,601,059 B2 | 10/2009 | Bozeman |
| 7,722,456 B2 | 5/2010 | Walker |
| D656,951 S | 4/2012 | Weir |
| D682,301 S | 5/2013 | Dijulio |
| D682,869 S | 5/2013 | Aroner |
| 8,460,090 B1 | 6/2013 | Gilliland |
| D696,265 S | 12/2013 | D'Amore |
| D696,677 S | 12/2013 | Corcoran |
| 8,608,556 B2 | 12/2013 | Olive |
| D701,223 S | 3/2014 | Cho |
| D716,326 S | 10/2014 | Lee |
| 8,957,897 B1 | 2/2015 | Weichselbaum |
| D732,569 S | 6/2015 | Anzures |
| D747,349 S | 1/2016 | Park |
| D761,282 S | 7/2016 | Bain |
| D766,961 S | 9/2016 | Choi |
| D767,621 S | 9/2016 | Gagnier |
| D768,154 S | 10/2016 | Kim |
| D768,707 S | 10/2016 | Gagnier |
| D781,908 S | 3/2017 | Bhandari |
| D783,046 S | 4/2017 | Dzjind |
| D789,384 S | 6/2017 | Lin |
| 9,711,006 B2 | 7/2017 | Kendall |
| D798,895 S | 10/2017 | Kim |
| D802,011 S | 11/2017 | Friedman |
| D808,422 S | 1/2018 | Hoffman |
| D810,117 S | 2/2018 | Lin |
| D810,123 S | 2/2018 | Mcclellan |
| D816,698 S | 5/2018 | Oldenburger |
| D819,059 S | 5/2018 | O'Toole |
| D819,060 S | 5/2018 | Friedman |
| D824,933 S | 8/2018 | Harris |
| D830,406 S | 10/2018 | Baldi |
| D833,468 S | 11/2018 | Hsu |
| D841,047 S | 2/2019 | Papolu |
| 10,242,534 B2 | 3/2019 | Bryant |
| 10,262,501 B2 | 4/2019 | Satterlie |
| D849,036 S | 5/2019 | Fuller |
| D849,046 S | 5/2019 | Kuo |
| D850,464 S | 6/2019 | Satterlie |
| D855,064 S | 7/2019 | Lei |
| 10,453,306 B2 | 10/2019 | Crispino |
| D870,767 S | 12/2019 | Villafañe |
| D873,280 S | 1/2020 | Beesley |
| D873,852 S | 1/2020 | Pazmino |
| D873,855 S | 1/2020 | De Regt |
| 10,535,229 B2 | 1/2020 | Olive |
| D879,796 S | 3/2020 | Hung |
| D881,900 S | 4/2020 | Harmann |
| D882,625 S | 4/2020 | Dixit |
| D887,436 S | 6/2020 | Crandall |
| D888,089 S | 6/2020 | Chaudhri |
| D890,200 S | 7/2020 | Kokubo |
| D895,642 S | 9/2020 | Hoofnagle |
| D895,661 S | 9/2020 | Lei |
| 10,789,812 B2 | 9/2020 | Sanborn |
| D900,123 S | 10/2020 | Lopes et al. |
| 10,810,840 B2 | 10/2020 | Casey |
| D903,691 S | 12/2020 | Olive |
| D907,652 S | 1/2021 | Momchilov |
| D908,134 S | 1/2021 | Liebowitz |
| D915,439 S | 4/2021 | Chapple |
| D916,817 S | 4/2021 | Cicchi |
| D916,922 S | 4/2021 | Ive |
| 10,970,958 B2 | 4/2021 | Hirai |
| D921,013 S | 6/2021 | Boese |
| D922,409 S | 6/2021 | Msser |
| D923,024 S | 6/2021 | Montoya |
| D923,047 S | 6/2021 | Montoya |
| D924,248 S | 7/2021 | Boese |
| D924,921 S | 7/2021 | Bowey |
| D925,575 S | 7/2021 | Harmann |
| D926,218 S | 7/2021 | Moreira |
| D926,778 S | 8/2021 | Lockley |
| D927,535 S | 8/2021 | Pazmino |
| D927,547 S | 8/2021 | Visser |
| D928,197 S | 8/2021 | Pazmino |
| D931,885 S | 9/2021 | Davies |
| D938,972 S | 12/2021 | Boese |
| D940,742 S | 1/2022 | Vickers |
| D942,466 S | 2/2022 | Degens |
| D943,609 S | 2/2022 | Li |
| 11,263,871 B2 | 3/2022 | Penacho |
| D949,166 S | 4/2022 | Marks |
| D949,167 S | 4/2022 | Marks |
| D951,272 S | 5/2022 | Olive |
| D952,646 S | 5/2022 | Ludwick |
| 11,450,181 B2 | 9/2022 | Uberuaga |
| D974,398 S | 1/2023 | Visser |
| D975,128 S | 1/2023 | Visser |
| 11,676,444 B2 | 6/2023 | Kendall |
| 2002/0094856 A1 | 7/2002 | Bennett |
| 2002/0107072 A1 | 8/2002 | Giobbi |
| 2003/0064793 A1 | 4/2003 | Baerlocher |
| 2004/0038733 A1* | 2/2004 | Walker ............... G07F 17/3244 463/25 |
| 2004/0087368 A1 | 5/2004 | Gauselmann |
| 2004/0106448 A1 | 6/2004 | Gauselmann |
| 2004/0235552 A1 | 11/2004 | Gauselmann |
| 2004/0266520 A1 | 12/2004 | Aida |
| 2005/0043082 A1 | 2/2005 | Peterson |
| 2006/0003829 A1 | 1/2006 | Thomas |
| 2006/0046830 A1 | 3/2006 | Webb |
| 2006/0148562 A1 | 7/2006 | Walker |
| 2007/0060254 A1 | 3/2007 | Muir |
| 2007/0077979 A1 | 4/2007 | Cohn |
| 2007/0243923 A1 | 10/2007 | Seelig |
| 2008/0113734 A1 | 5/2008 | Watkins |
| 2008/0207312 A1 | 8/2008 | Seelig |
| 2009/0069063 A1 | 3/2009 | Thomas |
| 2009/0093299 A1 | 4/2009 | Acres |
| 2009/0118000 A1 | 5/2009 | Yoshizawa |
| 2009/0197666 A1 | 8/2009 | Visser |
| 2009/0197668 A1 | 8/2009 | Visser |
| 2009/0264171 A1 | 10/2009 | Acres |
| 2009/0305770 A1 | 12/2009 | Bennett |
| 2010/0029381 A1 | 2/2010 | Vancura |
| 2010/0323780 A1 | 12/2010 | Acres |
| 2011/0105216 A1 | 5/2011 | Cohen |
| 2012/0046089 A1 | 2/2012 | Kemper |
| 2012/0122544 A1 | 5/2012 | Roemer |
| 2013/0065665 A1 | 3/2013 | Watkins |
| 2013/0065674 A1 | 3/2013 | Luciano, Jr. |
| 2013/0157741 A1 | 6/2013 | Pacey |
| 2013/0252704 A1 | 9/2013 | Gilbertson |
| 2013/0281181 A1 | 10/2013 | Langille |
| 2014/0018146 A1 | 1/2014 | Zielinski |
| 2014/0057699 A1 | 2/2014 | Pade |
| 2014/0080570 A1 | 3/2014 | Watkins |
| 2014/0080601 A1* | 3/2014 | Knutsson ............... A63F 13/75 463/31 |
| 2014/0100022 A1 | 4/2014 | Lewis |
| 2014/0135096 A1 | 5/2014 | Aida |
| 2014/0171182 A1* | 6/2014 | Versaci ............... A63F 13/795 463/25 |

(56) References Cited

U.S. PATENT DOCUMENTS

| 2014/0179396 A1 | 6/2014 | Aoki |
|---|---|---|
| 2014/0248938 A1 | 9/2014 | Tidke |
| 2014/0274282 A1 | 9/2014 | Mastropietro |
| 2014/0274299 A1 | 9/2014 | Kitamura |
| 2014/0274308 A1 | 9/2014 | Guinn |
| 2014/0295942 A1 | 10/2014 | Kendall |
| 2014/0364193 A1 | 12/2014 | Williamson |
| 2015/0087389 A1 | 3/2015 | Ratner |
| 2015/0094129 A1 | 4/2015 | Acres |
| 2015/0099569 A1 | 4/2015 | Suda |
| 2015/0141114 A1 | 5/2015 | Davis |
| 2015/0206397 A1 | 7/2015 | Nelson |
| 2015/0235511 A1 | 8/2015 | Zoble |
| 2015/0262450 A1 | 9/2015 | Elias |
| 2015/0287286 A1 | 10/2015 | Beria |
| 2016/0086442 A1 | 3/2016 | Hilbert |
| 2016/0104344 A1 | 4/2016 | Meyer |
| 2016/0133100 A1 | 5/2016 | Pececnik |
| 2016/0247361 A1 | 8/2016 | Meyer |
| 2016/0328926 A1 | 11/2016 | Boese |
| 2017/0024955 A1 | 1/2017 | Pawloski |
| 2017/0024957 A1 | 1/2017 | Boese |
| 2017/0076536 A1 | 3/2017 | Shiraishi |
| 2017/0092047 A1 | 3/2017 | Hendricks |
| 2017/0092070 A1 | 3/2017 | Marston |
| 2017/0169662 A1 | 6/2017 | Froy |
| 2017/0365127 A1 | 12/2017 | Zoble |
| 2018/0025585 A1 | 1/2018 | Schmidt |
| 2018/0075692 A1 | 3/2018 | Hirai |
| 2018/0082533 A1 | 3/2018 | Hallerbach |
| 2018/0089942 A1 | 3/2018 | Filipour |
| 2018/0130296 A1 | 5/2018 | Berman |
| 2018/0197379 A1 | 7/2018 | Crispino |
| 2018/0204632 A1 | 7/2018 | Kang |
| 2018/0225924 A1 | 8/2018 | Cohen |
| 2019/0043316 A1 | 2/2019 | Selegue |
| 2019/0051097 A1 | 2/2019 | Marks |
| 2019/0051099 A1 | 2/2019 | Pawloski |
| 2019/0130705 A1 | 5/2019 | Nelson |
| 2019/0304248 A1 | 10/2019 | Bryant |
| 2019/0355206 A1 | 11/2019 | Kania |
| 2020/0051374 A1 | 2/2020 | Solaja |
| 2020/0074784 A1 | 3/2020 | Caputo |
| 2020/0098221 A1 | 3/2020 | Hendricks |
| 2020/0160663 A1 | 5/2020 | Berman |
| 2020/0312086 A1 | 10/2020 | Kendall |
| 2020/0312087 A1 | 10/2020 | Kendall |
| 2020/0312095 A1 | 10/2020 | Kendall |
| 2020/0357240 A1 | 11/2020 | Tam |
| 2021/0065513 A1 | 3/2021 | Ludwick |
| 2021/0104127 A1 | 4/2021 | Schaefer |
| 2021/0110676 A1 | 4/2021 | Davis |
| 2021/0256811 A1 | 8/2021 | Ma |
| 2022/0122010 A1 | 4/2022 | Barcelos |
| 2023/0015353 A1 | 1/2023 | Uberuaga |
| 2023/0033113 A1 | 2/2023 | Penacho |
| 2023/0169118 A1 | 6/2023 | Aso |
| 2024/0029517 A1 | 1/2024 | Redick |

OTHER PUBLICATIONS

Office Action dated Aug. 27, 2020 for U.S. Appl. No. 16/659,177 (pp. 1-6).
Notice of Allowance dated Sep. 29, 2020 for U.S. Appl. No. 16/659,177 (pp. 1-9).
Office Action (Non-Final Rejection) dated Jan. 10, 2022 for U.S. Appl. No. 17/150,839 (pp. 1-6).
Aristocrat Technologies Australia Pty Limited, "Fu Dai Lian Lian Panda," downloaded from https://www.aristocrat.com/apac/games/ba-bao-huang-long-emperor-2-2/, 4 pp. (downloaded on Feb. 13, 2020).
Vimeo, "Fu Dai Lian Lian," downloaded from https://vimeo.com/352401309, 10 pp. (downloaded on Feb. 13, 2020).
Youtube video, "Cash Fusion—Peacock Riches," MGS Summit Macau, downloaded from https://www.youtube.com/watch?v=6jaKVWJt56Q, 1 p. (Nov. 2017).
Office Action dated May 18, 2020 for U.S. Appl. No. 16/779,540 (pp. 1-12).
Notice of Allowance dated Aug. 27, 2020 for U.S. Appl. No. 16/779,540 (pp. 1-8).
Office Action dated Jan. 14, 2021 for U.S. Appl. No. 29/722,810 (pp. 1-7).
New Game Nice Profit Fu Dai Lian Lian Dragon Slot (Aristocrat), by Kuri Slot, dated Dec. 11, 2019, youtube.com [online]. Retrieved Jan. 11, 2021 from internet <URL:https://www.youtube.com/watch?v=5kX2ZXirx_O> (Year: 2019).
Fu Dai Lian Lian, dated to Oct. 25, 2020, aristocrat-us.com [online]. Retrieved from internet <URL:https://web.archive.org/web/20201125023325/https://www.aristocrat-us.com/fu-dai-lian-lian>(Year: 2020).
Notice of Allowance dated Feb. 18, 2021 for U.S. Appl. No. 29/722,810 (pp. 1-8).
Notice of Allowance dated Jun. 16, 2021 for U.S. Appl. No. 29/722,813 (pp. 1-9).
Julia Lemba, "Moneybag Simple Cartoon" Mar. 14, 2019 https://www.istockphoto.com/vector/moneybag-simple-cartoon-infographics-isolated-on-blue-background-moneybag-simple-gm1135787086-302281081.
Office Action dated Jun. 18, 2021 for U.S. Appl. No. 16/790,548 (pp. 1-16).
Corrected Notice of Allowability dated Jul. 8, 2021 for U.S. Appl. No. 29/722,813 (pp. 1-2).
Office Action (Non-Final Rejection) dated Jan. 7, 2022 for U.S. Appl. No. 16/830,232 (pp. 1-13).
Office Action (Non-Final Rejection) dated Jan. 21, 2022 for U.S. Appl. No. 16/830,239 (pp. 1-19).
Office Action (Final Rejection) dated Jan. 20, 2022 for U.S. Appl. No. 16/790,548 (pp. 1-16).
Office Action (Non-Final Rejection) dated Feb. 22, 2022 for U.S. Appl. No. 17/129,427 (pp. 1-10).
Office Action (Non-Final Rejection) dated Mar. 29, 2022 for U.S. Appl. No. 17/388,894 (pp. 1-22).
Office Action (Notice of Allowance and Fees Due (PTOL-85)) dated Apr. 27, 2022 for U.S. Appl. No. 17/150,839 (pp. 1-8).
Office Action (Notice of Allowance and Fees Due (PTOL-85)) dated May 17, 2022 for U.S. Appl. No. 16/790,548 (pp. 1-9).
Notice of Allowance dated May 13, 2022 for U.S. Appl. No. 29/782,345 (pp. 1-11).
Notice of Allowance dated May 16, 2022 for U.S. Appl. No. 29/809,073 (pp. 1-11).
New Game Nice Profit, by Kuri Slot, dated Dec. 11, 2019, youtube.com [online]. Retrieved May 5, 2022 from internet <URL:https://www.youtube.com/watch?v=5kX2ZXirx_0> (Year:2019).
Notice of Allowance dated Jun. 20, 2022 for U.S. Appl. No. 29/795,991 (pp. 1-9).
Notice of Allowance dated Jun. 20, 2022 for U.S. Appl. No. 29/808,901 (pp. 1-9).
Notice of Allowance dated Jun. 27, 2022 for U.S. Appl. No. 29/782,345 (pp. 1-8).
Notice of Allowance dated Jun. 27, 2022 for U.S. Appl. No. 29/809,073 (pp. 1-8).
Office Action (Notice of Allowance and Fees Due (PTOL-85)) dated Jul. 15, 2022 for U.S. Appl. No. 16/830,232 (pp. 1-9).
Office Action (Notice of Allowance and Fees Due (PTOL-85)) dated Sep. 1, 2022 for U.S. Appl. No. 16/830,239 (pp. 1-8).
Notice of Allowance dated Jul. 27, 2022 for U.S. Appl. No. 29/795,991 (pp. 1-4).
Office Action (Notice of Allowance and Fees Due (PTOL-85)) dated Jul. 25, 2022 for U.S. Appl. No. 17/129,427 (pp. 1-7).
Notice of Allowance dated Aug. 19, 2022 for U.S. Appl. No. 29/795,991 (pp. 1-7).
Notice of Allowance dated Aug. 19, 2022 for U.S. Appl. No. 29/808,901 (pp. 1-7).
Office Action (Notice of Allowance and Fees Due (PTOL-85)) dated Oct. 26, 2022 for U.S. Appl. No. 16/830,239 (pp. 1-5).

(56) References Cited

OTHER PUBLICATIONS

Office Action (Notice of Allowance and Fees Due (PTOL-85)) dated Oct. 19, 2022 for U.S. Appl. No. 16/830,232 (pp. 1-5).

Office Action (Notice of Allowance and Fees Due (PTOL-85)) dated Oct. 21, 2022 for U.S. Appl. No. 17/129,427 (pp. 1-7).

Office Action (Final Rejection) dated Nov. 21, 2022 for U.S. Appl. No. 17/388,894 (pp. 1-24).

Office Action (Notice of Allowance and Fees Due (PTOL-85)) dated Feb. 15, 2023 for U.S. Appl. No. 16/830,239 (pp. 1-5).

Office Action (Notice of Allowance and Fees Due (PTOL-85)) dated Jan. 31, 2023 for U.S. Appl. No. 16/830,232 (pp. 1-5).

Office Action (Notice of Allowance and Fees Due (PTOL-85)) dated Feb. 9, 2023 for U.S. Appl. No. 17/129,427 (pp. 1-7).

Notice of Allowance dated May 1, 2023 for U.S. Appl. No. 29/809,716 (pp. 1-9).

Office Action (Non-Final Rejection) dated Jun. 23, 2023 for U.S. Appl. No. 17/932,873 (pp. 1-19).

Office Action (Notice of Allowance and Fees Due (PTOL-85)) dated Aug. 18, 2023 for U.S. Appl. No. 17/388,894 (pp. 1-9).

Notice of Allowance dated Sep. 11, 2023 for U.S. Appl. No. 29/881,793 (pp. 1-10).

Iv_design, "Different colorful empty bowl" Nov. 6, 2017 https://www.istockphoto.com/vector/ vector-illustration-set-of-food-icons-different-colourful-empty-bowls-for-breakfast-gm870471238.

Office Action (Non-Final Rejection) dated Dec. 14, 2023 for U.S. Appl. No. 18/141,836 (pp. 1-11).

Office Action (Notice of Allowance and Fees Due (PTOL-85)) dated Jan. 9, 2024 for U.S. Appl. No. 17/932,873 (pp. 1-8).

Office Action (Notice of Allowance and Fees Due (PTOL-85)) dated Feb. 26, 2024 for U.S. Appl. No. 18/141,836 (pp. 1-8).

Office Action (Non-Final Rejection) dated Aug. 26, 2024 for U.S. Appl. No. 18/196,320 (pp. 1-8).

Office Action (Non-Final Rejection) dated Nov. 1, 2024 for U.S. Appl. No. 17/957,477 (pp. 1-10)

Office Action (Non-Final Rejection) dated Dec. 2, 2024 for U.S. Appl. No. 17/957,482 (pp. 1-15).

Australian Examination Report No. 1 issued in App. No. AU2019232939, dated Dec. 23, 2024, 7 pages Australian Examination Report No. 1 issued in App. No. AU2019232942 dated Feb. 13, 2025, 7 pages.

Notice of Allowance dated Jul. 8, 2025 for U.S. Appl. No. 18/196,320 (pp. 1-8).

Office Action (Non-Final Rejection) dated Aug. 8, 2025 for U.S. Appl. No. 17/957,477 (pp. 1-15).

* cited by examiner

| Reel strip position | Reel 1 | Reel 2 | Reel 3 | Reel 4 | Reel 5 |
|---|---|---|---|---|---|
| 1 | Scat 1 | 10 | Scat 3 | Q | Scat 1 |
| 2 | Wild | Q | K | A | 10 |
| 3 | J | K | 10 | 10 | A |
| 4 | Q | A | Q | Scat 2 | Scat 2 |
| 5 | 10 | Scat 2 | K | J | A |
| 6 | A | 9 | Scat 1 | Wild | Q |
| 7 | Scat 2 | Wild | J | 9 | K |
| 8 | A | Scat 3 | K | 13 | Scat 2 |
| 9 | Q | Q | 9 | A | 9 |
| 10 | K | 10 | Q | Q | Wild |
| 11 | J | A | 10 | J | 9 |
| 12 | 10 | Wild | Wild | K | Q |
| 13 | Scat 3 | K | A | Wild | 10 |
| 14 | Wild | J | A | Scat 3 | Wild |
| 15 | 9 | 10 | Wild | Scat 1 | A |

*FIG. 3*

ELECTRONIC GAMING DEVICE WITH MULTIPLE DYNAMICALLY CONFIGURABLE FEATURES DEPENDENT ON GAME STATES

RELATED APPLICATIONS

The present application is a continuation of and claims priority to U.S. patent application Ser. No. 17/388,894, filed Jul. 29, 2021, entitled "Electronic Gaming Device with Multiple Dynamically Configurable Features Dependent on Game States," which claims priority to Australian Patent Application No. 2020902685, filed Jul. 30, 2020, and Australian Patent Application No. 2020233655, filed Sep. 15, 2020, entitled "Gaming Device with Multiple Triggerable Features Dependent on States," all of which are hereby incorporated by reference in their entireties.

BACKGROUND

The present application relates to a gaming device, a method of operating a gaming device and a gaming system. The gaming device, the method and the gaming system enable the provision of multiple triggerable feature games which are dependent on at least one gaming device state when a trigger occurs.

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (return to player=RTP) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Certain embodiments provide a gaming device, a method of operating a gaming device and a system which implement a spinning reel game where there are a number of different feature games that can be triggered. As well as individual feature games, there is at least one composite feature game made up of individual game play characteristics of individual feature games. The composite feature games have the chance of triggering too. Each individual feature game has at least one unenhanced game play characteristic corresponding to an unenhanced state and an enhanced game play characteristic corresponding to an enhanced state. Where a composite feature is triggered it inherits the states of the individual feature games such that if one or more individual feature games are in an enhanced state, the composite feature will include the corresponding enhanced game play characteristic.

In an embodiment, a gaming device comprises a display, a processor, and a memory storing (a) feature game data defining a first feature game having at least one unenhanced first game play characteristic corresponding to a unenhanced state of the first feature game, an enhanced first game play characteristic corresponding to an enhanced state of the first feature game, a second feature game having a unenhanced second game play characteristic corresponding to a unenhanced state of the second feature game and an enhanced second game play characteristic corresponding to the enhanced game play state, and a composite feature game dynamically configurable with game play characteristics of the first and second feature games, (b) current feature states for each of the first feature game and the second feature game, wherein possible feature states comprise the unenhanced state and the enhanced state of the first feature game and the unenhanced state and the enhanced state of the second feature game, and (c) instructions. When the instructions are executed by the processor they cause the processor to upon one of the first, second or composite feature games being triggered, initiate the triggered one of the feature games based on the current feature states, wherein when the composite feature game is triggered, initiating the composite feature game comprising dynamically configuring the composite feature game to incorporate game play characteristics corresponding to the unenhanced and enhanced features of the first and second games in dependence on the respective feature states of the first feature game and the second feature game; conduct the initiated feature game; and make any awards resulting from conduct of the initiated feature game.

Another embodiment provides a method of operating a gaming device comprising a display and memory storing (a) feature game data defining a first feature game having at least one unenhanced first game play characteristic corresponding to a unenhanced state of the first feature game, an enhanced first game play characteristic corresponding to an enhanced state of the first feature game, a second feature game having a unenhanced second game play characteristic corresponding to a unenhanced state of the second feature game and an enhanced second game play characteristic corresponding to the enhanced game play state, and a composite feature game dynamically configurable with game play characteristics of the first and second feature games, and (b) current feature states for each of the first feature game and the second feature game, wherein possible feature states comprise the unenhanced state and the enhanced state of the first feature game and the unenhanced state and the enhanced state of the second feature game. The method comprises upon one of the first, second or composite feature games being triggered, initiating the triggered one of the feature games based on the current feature states, wherein when the composite feature game is triggered, initiating the composite feature game comprising dynamically configuring the composite feature game to incorporate game play characteristics corresponding to the unenhanced and enhanced features of the first and second games in dependence on the respective feature states of the first feature game and the second feature game; conducting the initiated feature game; and making any awards resulting from conduct of the initiated feature game.

Another embodiment provides a system comprising one or more processors, and at least one memory storing (a) feature game data defining a first feature game having at least one unenhanced first game play characteristic corresponding to a unenhanced state of the first feature game, an enhanced first game play characteristic corresponding to an enhanced state of the first feature game, a second feature game having a unenhanced second game play characteristic corresponding to a unenhanced state of the second feature game and an enhanced second game play characteristic corresponding to the enhanced game play state, and a composite feature game dynamically configurable with game play characteristics of the first and second feature games, (b) current feature states for each of the first feature game and the second feature game, wherein possible feature states comprise the unenhanced state and the enhanced state of the first feature game and the unenhanced state and the enhanced state of the second feature game, and (c) instructions. When the instructions are executed by the one or more processors, they cause the one or more processors to, upon one of the first, second or composite feature games being triggered, initiate the triggered one of the feature games based on the current feature states, wherein when the composite feature game is triggered, initiating the composite feature game comprising dynamically configuring the composite feature game to incorporate game play characteristics corresponding to the unenhanced and enhanced features of the first and second games in dependence on the respective feature states of the first feature game and the second feature game; conduct the initiated feature game; and make any awards resulting from conduct of the initiated feature game.

BRIEF DESCRIPTION OF THE DRAWINGS

FIG. 3 illustrates an example reel strip layout.

DETAILED DESCRIPTION

Figure 1:
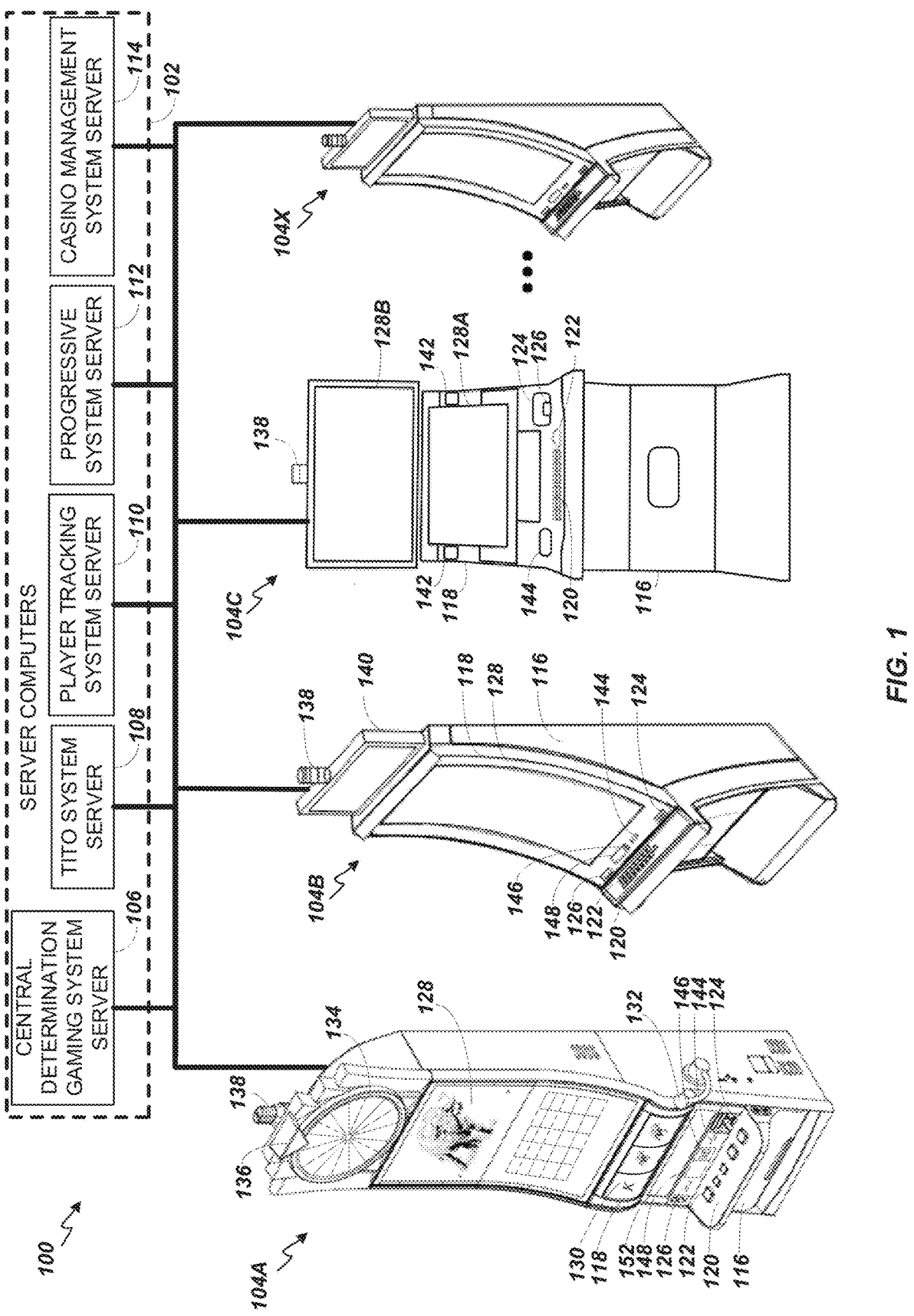
FIG. 1 is an exemplary diagram showing several EGMs networked with various gaming related servers.

Embodiments of the present disclosure represent a technical improvement in the art of electronic gaming machines, devices, systems, and operation of such electronic gaming machines, devices, or systems. Some embodiments of the present disclosure include an improved electronic gaming machine that dynamically configures a composite feature game based on a first feature game and a second feature game by employing special enhanced play characteristics.

However, game design challenges arise when implementing composite feature games with both enhanced and unenhanced play characteristics across feature games. That is, technical challenges occur, and have to be overcome, when unenhanced play characteristics and enhanced play characteristics are combined in a composite feature game, because the enhanced characteristics risk potential high payouts that exceed the allowable RTP. These challenges require realization of gaming machine processing configuration to control enhanced play characteristics across feature games due to changing volatility and to achieve a predetermined RTP for different feature games.

More specifically, by way of example, exemplary embodiments of the present disclosure improve the technical capability of the electronic gaming machines, devices, and systems. An enhanced technical capability may be accomplished by controlling the processor to provide boosts when metamorphic bags are at their highest states, where a processor is driven to perform a sequence of instructions involving multiple individual feature games and different game states stored in a memory based on a defined trigger probability associated with each of the feature games, including a composite feature game, and assigned ranges of values returnable in conjunction with a random number generator to trigger one or more of the feature games, for example. In general, embodiments of the present disclosure dynamically configure a composite feature game from individual feature games with individual game characteristics and their respective game states when the composite feature game is triggered, while still achieving a predetermined volatility or a predetermined RTP to comply with jurisdictional regulations.

Technical challenges exist in adding a plurality of feature combinations to accommodate both additional unenhanced states and additional enhanced states across feature games that include composite feature games. For example, unlike other games that typically include a number of feature combinations based only on the number of base game features available, improvements in the gaming machine technical capability facilitate use of additional states based on both enhanced states and unenhanced states of the feature games. For example, while there may be seven possible feature combinations for three different feature games for other combination features, the instant disclosure may include twenty-six possible feature combinations for three different feature games with unenhanced states and enhanced states. In such embodiments, twenty-six different feature combinations are changed. For example, changes may include how often or frequencies they are won, what the expected payouts are, and ensuring that "boosted" variants of the feature reliably paid more than non-boosted variants. This expands the game machine capability.

Additionally, unlike other games where points, credits, or states achieved in a game do not affect play characteristics of a combined feature game, in some embodiments of the present disclosure, the points, credits, or states achieved in a game adversely may affect how a composite feature game is played, and particularly, how the volatility is determined. For example, in some embodiments, the improvement in gaming machine capability occurs through operational advantages in, among other things, configuring a triggered feature game by processing dynamically to allow the coins accumulated, counted or monitored to trigger or activate an enhanced feature, to determine a number of reel spins to collect the coins required to activate the enhanced feature, to change weight tables and/or reels for determining wins and/or awards, and to determine additional payout or award dynamically when the enhanced feature is reached.

Challenges so occur in steady state feature game progressions. Improvements in game machine capability occur with embodiment of the present invention through recognition of the advantage of employing game processing to control the speeds or metamorphic progression at which feature games are transitioning or progressing from a current state to a higher state or a highest state, while achieving the RTP and game volatility. As such, in some embodiments, the metamorphic progression or speed may be controlled, for example, such that higher paying variations will access higher states quicker. In other embodiments, the metamorphic progression or speed may be controlled by having more states such that the transition from a lower state to the highest state may take longer. In yet other embodiments, the metamorphic progression or speed may be controlled, for example, such that higher paying variations will access higher states slower.

Additionally, an improvement in the graphical user interface of the game machine is achieved by employing a composite feature game that may, concurrently or subsequently, function to animate special effects on a display in response to one or more of the feature games being initiated based on a metamorphic progression. Such graphical effects on the display efficiently use the available fixed-size display screen of the gaming machine or device to visually communicate enhanced game play characteristics and outcomes, while still accommodating presentation and appreciation of traditional gaming visual effects, e.g., a base game, and credits, etc. Such a display allows the player to rapidly appreciate and understand visually the graphical effects game progress, award differences and gaming actions to be taken without being overly burdened by complicated visual presentation and mathematical calculations. The enhanced display, in turn, provides improved game interaction and anticipation characteristics for the player and provide more varied game outcomes. Thus, embodiments of the present disclosure are not merely new game rules or simply new display patterns, but provide technologic improvements to computer and gaming capabilities and graphical user interfaces in the technical art of electronic gaming machines.

The above example is not intended to be limiting, but merely exemplary of technologic improvements provided by some embodiments of the present disclosure. Technological improvements of other embodiments are readily apparent to those of ordinary skill in the art in light of the present disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a standalone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
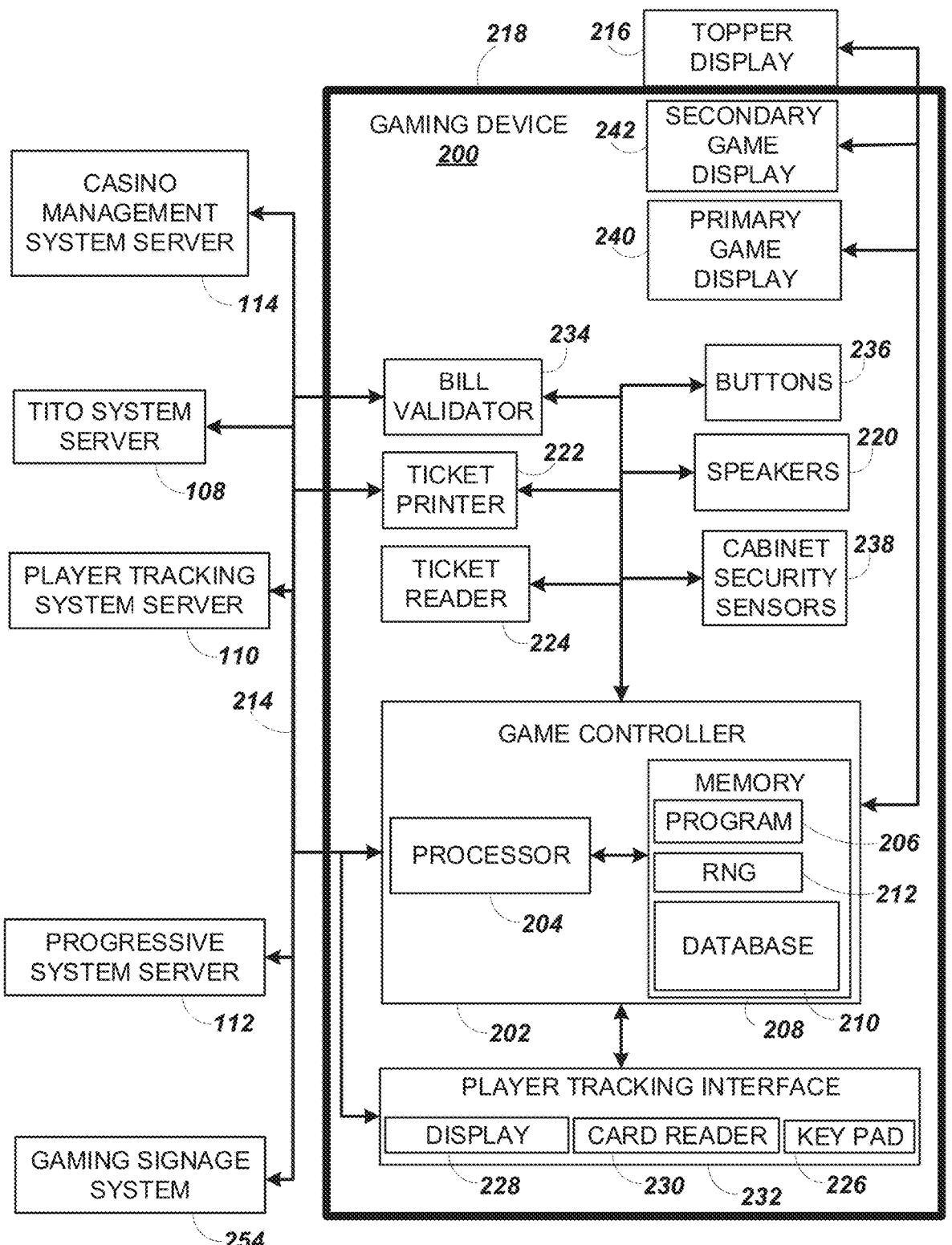
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display

128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device

200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
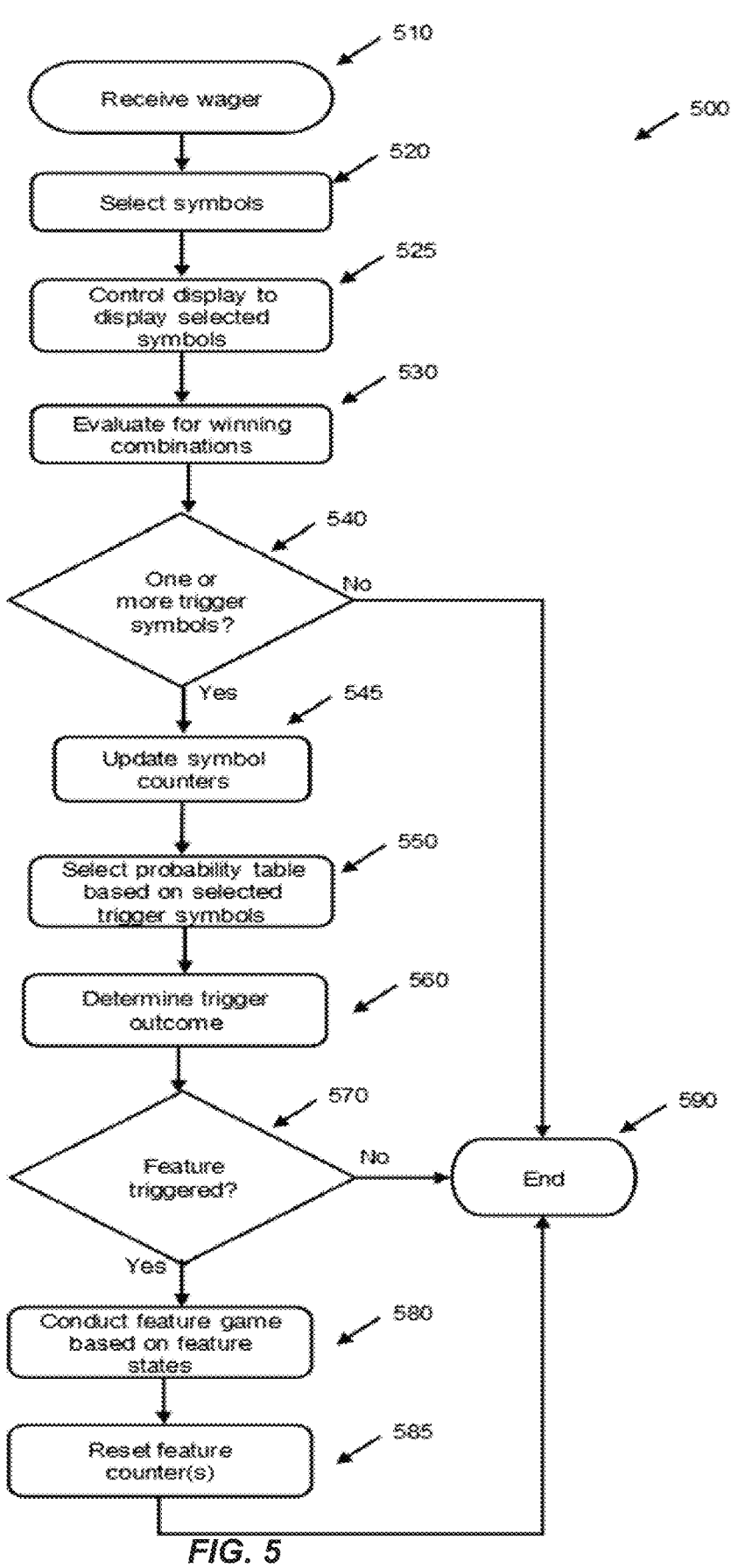
FIG. 5 is a flow chart of an embodiment.

FIG. 5 is a flow chart of a method 500 of operating a gaming device 200 of an embodiment. At step 510, the gaming device 200 receives the player's wager which is input as described above. In this example, the number of pay lines are fixed and the only option available to a player is to select a different bet amount (in effect a bet multiplier). At step 520, the processor 204 selects symbols for display on display 240 from reel strips stored in the memory 208.

FIG. 3 illustrates an example of a set 300 of five reel strips 321, 322, 323, 324, 325. In the example, each reel strip has fifteen reel strip positions 301-315. Each reel strip position of each reel has a symbol. For example, a "WILD" symbol 331 occupies the sixth reel strip position 306 of the fourth reel 324. The reel strips 321-325 are configured so that more than one trigger symbol can be selected at once. In this example, the reel strips include three different trigger symbols ("SCAT 1", "SCAT 2", and "SCAT 3"). The trigger symbols are located across the reel strips such that they can be selected concurrently, in particular by being selected from different reels. One possible selectable combination of all three trigger symbols is the selection of SCAT 3 symbol 343 from first reel 321, SCAT 1 symbol 344 from third reel 323, and SCAT 2 symbol from fifth reel 325. ("SCAT" is an abbreviation for "scatter" and is indicative of the fact that it does not matter at which symbol positions the "SCAT" symbols are selected.)

Other reels strips to those illustrated in FIG. 3 can be used, for example, reel strips where two or more WILD symbols are placed at consecutive reel strip positions of a reel strip. In other examples, the reel strips could have between 30 and 100 reel strip positions. The actual length of the reel strips depends on factors such as the number of WILD symbols (in general, the more WILDs there are, the longer the reel strip needs to be to maintain the target RTP), the number of trigger symbols on each reel, and volatility (in general, the higher the prize value is, the longer the reel strip needs to be to lower the hit rate to maintain the target RTP).

Figure 4:
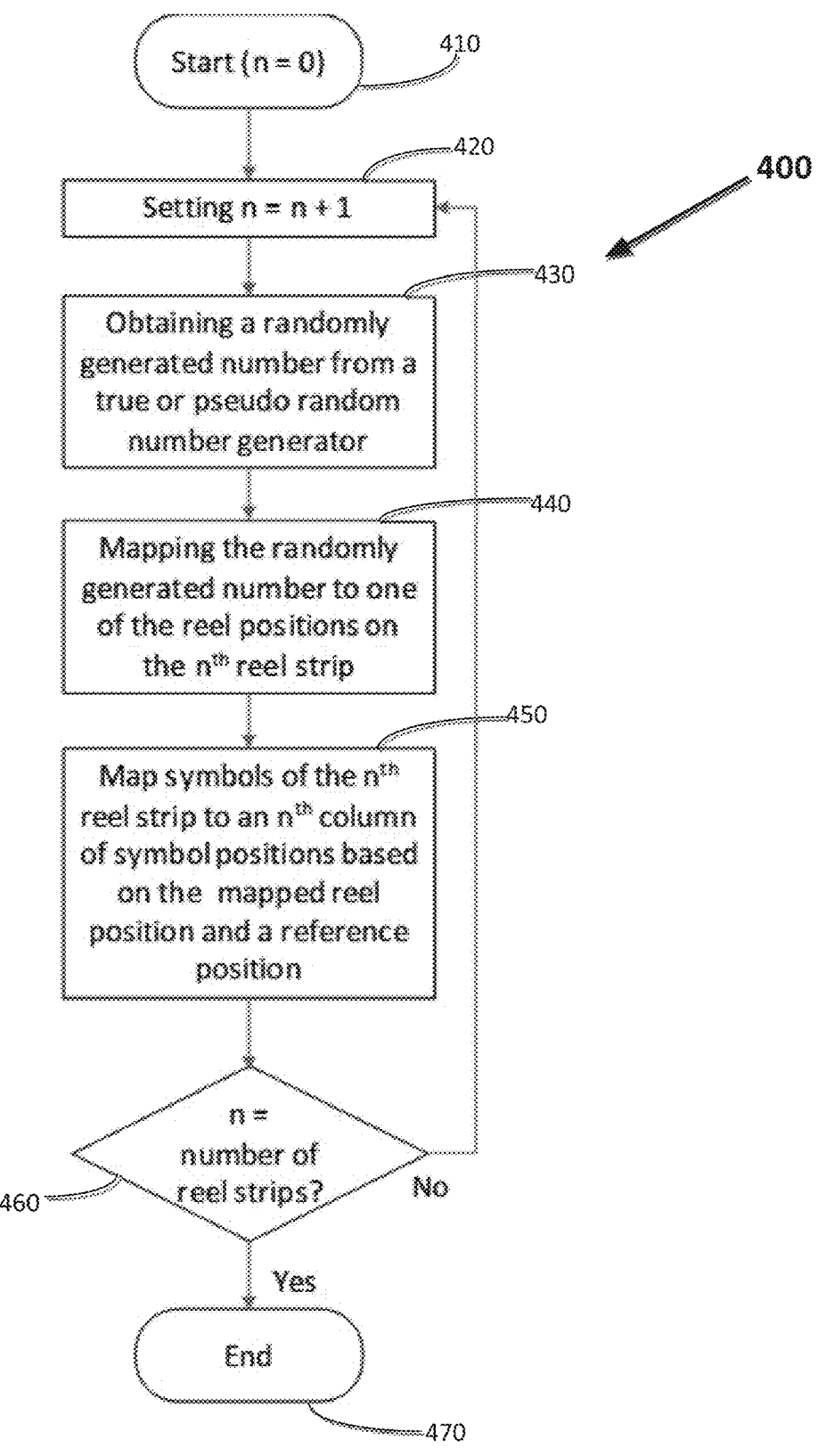
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip (n=1). At step 430, the processor obtains a randomly generated number from a true or pseudo random number generator 212. At step 440, the processor maps the randomly generated number to one of the reel positions of the nth reel strip. In the first iteration, this is the first reel strip. To map the randomly generated number to one of the reel strip positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel strip position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. That is, in effect, selecting one reel strip position selects a portion of the reel strip having three reel strip positions for display. Referring to the example reel strips of FIG. 3, if the value returned by the RNG 212 is mapped to reel position 313, then for the first reel strip 321, "SCAT 3" symbol 343 is mapped to a bottom symbol position, "10" symbol 342 is mapped to a middle symbol position, and "J" symbol is mapped to a top symbol position. It will be appreciated that the same technique can be used to select a different number of symbols from each reel strip by using a different number of neighboring reel strip positions.

At step 460, the processor 460 determines whether symbols have been selected for all of the reel strips, and if not the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, at step 525, the processor 204 controls display 240 to display the selected symbols at the symbol positions.

At step 530, the processor 204 evaluates the selected symbols for winning combinations based on a pay table stored in memory 204. In an example, the processor 204 checks each pay line activated by the player's wager to determine whether it has a winning combination of symbols (e.g. three, four or five of a symbol included in the pay table). In an example, the processor 204 evaluates each pay line from left to right—i.e. the winning combination must start in the left most column. WILD symbols substitute for all other symbols in this evaluation. The processor 204 makes an award for each winning combination based on any selected bet multiplier by adding an award to a win meter stored in memory 208. In an example, there are 50 pay lines and each wager involves activating all pay lines—i.e. the number of pay lines is fixed.

As described above, in this example, the reel strips comprise three trigger symbols (SCAT 1, SCAT 2, and SCAT 3). In an embodiment, the selection of a respective symbol results in a chance of triggering an associated free-game feature game (Ft 1, Ft 2, or Ft 3). Where more than one trigger symbol is selected, in addition to there being a chance of triggering the respective feature game, there is a chance of triggering features that combine game play characteristics of the individual feature games which are combined to form composite features (Ft 1+2, Ft 1+3, Ft 2+3, Ft 1+2+3). Whether a single feature or composite feature is triggered depends on a weight table. An example of a weight table is set out in Table 1 below:

TABLE 1

| | Ft1 | Ft2 | Ft3 | Ft (1 + 2) | Ft (1 + 3) | Ft (2 + 3) | Ft (1 + 2 + 3) | None | (sum) |
|---|---|---|---|---|---|---|---|---|---|
| Scat 1 | 0.5 | 0 | 0 | 0 | 0 | 0 | 0 | 0.5 | 1 |
| Scat 2 | 0 | 0.5 | 0 | 0 | 0 | 0 | 0 | 0.5 | 1 |
| Scat 3 | 0 | 0 | 0.5 | 0 | 0 | 0 | 0 | 0.5 | 1 |
| Scat 1&2 | 0.2 | 0.2 | 0 | 0.1 | 0 | 0 | 0 | 0.5 | 1 |
| Scat 1&3 | 0.2 | 0 | 0.2 | 0 | 0.1 | 0 | 0 | 0.5 | 1 |
| Scat 2&3 | 0 | 0.2 | 0.2 | 0 | 0 | 0.1 | 0 | 0.5 | 1 |
| Scat 1to3 | 0.1 | 0.1 | 0.1 | 0.08 | 0.04 | 0.04 | 0.04 | 0.5 | 1 |

In order to implement this functionality, at step 540, the processor 204 determines whether the selected symbols include one or more trigger symbols. In this respect, it will be appreciated step 540 can be initiated before or after the symbols are displayed. At step 545, the processor 204 updates individual trigger symbol counters stored in memory 204 for the respective trigger symbols. The values of the trigger symbol counters determine whether the associated feature games are in an unenhanced or enhanced state, which in turn affect which game play characteristic of the respective feature game will be implemented as described in further detail below. In an example, progress towards the enhanced state of each feature game is graphically displayed on the display 240 as explained in further detail below in relation to Table 2.

The processor 204 also uses the identity of the trigger symbol(s) to select a set of one or more trigger probabilities from the table at step 550. In this respect, referring to Table 1, in an example, where only a SCAT 1 is selected, processor 204 determines that a trigger probability of 0.5 applies to triggering the first feature game (Ft 1), and hence there is a probability of 0.5 that no feature will trigger. In another example, where SCAT 1, SCAT 2, and SCAT 3 are selected, a trigger probability of 0.1 applies to triggering a first feature game, a trigger probability of 0.1 applies to triggering a second feature game, a trigger probability of 0.1 applies to triggering a third feature game, a trigger probability of 0.08 applies to a first composite feature game having game play characteristics of the first and second feature games, a trigger probability of 0.04 applies to a second composite feature game having game play characteristics of the first and third feature games, a trigger probability of 0.04 applies to a third composite feature game having game play characteristics of the second and third feature games, and a trigger probability of 0.04 applies to a fourth composite feature game having game play characteristics of the first, second and third feature games.

Based on the assigned trigger probability or probabilities, the processor 204 assigns ranges of values returnable by RNG 212 to the respective feature games. The processor 204, then at step 560, determines a trigger outcome based on the trigger probability or probabilities by obtaining a value from RNG 212 and comparing the returned value to the assigned ranges. If the returned value corresponds to one of the assigned ranges, the trigger outcome is that the processor 204 awards the relevant feature game at step 570, and after controlling the display 240 to indicate that the relevant feature game is awarded as will be described in further detail below. In the example, of Table 1, a possible trigger outcome for all combinations of trigger symbols is that no feature game is triggered.

It will be appreciated that in another example, the weight table may associate ranges of values returnable from the RNG 212 with specific outcomes rather than specifying probabilities.

Table 1 is only one example where N=3 is the number of trigger symbols and there are up to 2^N−1=7 triggerable features plus a probability of triggering no feature. In an alternative example, a feature game may trigger each time a trigger symbol lands, such that the processor 204, effectively only determines a trigger outcome that defines which of the 2^N−1=7 triggerable features will trigger, not whether a feature will trigger.

In another example, where N=2 there may only be two trigger symbols and up to 2^N−1=3 triggerable features, with or without a probability of triggering no feature. In another example, there may be more than three trigger symbols. In an example, not all possible combinations of trigger symbols are mapped to a feature game. For example, where N=4, in one example, there are feature games associated with each individual trigger symbol and each combination of two trigger symbols but not with combinations of three or more trigger symbols.

When the trigger outcome is that a feature game will be conducted, then processor initiates the triggered feature game based on the feature states and conducts the feature game at step 580. In some embodiments, at least one of the individual trigger symbol counters is reset at step 585 before the process ends at step 590. In one example, all the counters are reset. In another example, only the counter(s) corresponding to the selected trigger symbol(s) is/are reset. In yet another example, only the counter(s) corresponding to the triggered game play characteristic(s), whether unenhanced or enhanced, is/are reset. In a further example, only the counter(s) corresponding to the triggered and enhanced game play characteristic(s) is/are reset. In some embodiments, conducting the triggered feature game, whether the triggered feature game is a composite feature game or a standalone feature game, may require RTP changes, when the feature game has entered the enhanced state. Unlike other games where feature games keep the same game rules, when a feature game has entered an enhanced state, a number of determinations may have to be made. For example, how an unenhanced state may be advanced to an enhanced state, how many points, coins, credits, and/or symbols may have to be collected in each of the bags for such advancements, how many reel spins may be needed for a predetermined number of points, coins, credits, and/or symbols to be collected per spin, how much additional awards may be awarded for the enhanced state when a typical award is awarded for the unenhanced state, and how some or all of the weight tables and/or reels may be changed to achieve a volatility or RTP for an enhanced state. In some embodiments, the collection of coins, credits, and/or symbol may be reflected by the increasing sizes of bags presented on the display device. As further detailed below, however, some of the increments of sizes of bags may also be controlled so that bags associated with higher paying awards may be incremented faster than others, and vice versa.

From a game design perspective, when compared to other composite games, the triggered feature game (including a composite feature and a standalone enhanced feature game), a number of technical issues are tracked and/or changed to proper implement the enhanced game play characteristics. For example, instead of simply tracking the binary combinations of the standalone feature games, to implement the triggered feature game with enhanced features may require multiples of the binary combinations of the standalone feature games with and without the enhanced features.

An example set of feature games, how their game play characteristics are combined to form composite features based on feature state, and hence how they will be conducted is set out below.

Feature 1 (Reel Growth and Nudge WILDs—the "Prosperity Feature")

In this example, Feature 1 (Ft 1) is triggerable based on an assigned trigger probability when SCAT 1 is a selected trigger symbol. When Feature 1 is triggered in an unenhanced state, 5 free games are awarded. In the unenhanced state, during Feature 1 the array of symbol positions "grows" so that there are 6 symbol positions in each column. In each of the free games 100 pay lines are played—i.e. will be evaluated by processor 204. If a WILD appears in any position on reels 2, 3, 4 and/or 5 (that is in the relevant column of symbol position), the relevant reel(s) is nudged (moved to a new position) so that all symbols on that reel become WILD symbols. That is, the reel strips that employed during the unenhanced free games include stacks of WILD symbols sufficient to fill an entire column of symbol positions. The symbols are evaluated by the processor 204 after the reels have been nudged.

In an example, when Feature 1 is in an enhanced or "boosted" state, the array of symbol positions "grows" further so that there are eight symbol positions and 150 pay lines.

In an alternative example, rather than adding further symbol positions, the enhanced state increases the chance of wild symbols appearing by incorporating a random process where processor 204 determines whether all symbols of a column are turned wild. In yet another alternative example, the growth and height of the symbol array is determined on a per free game basis. In this example, in the unenhanced state, the processor 204 first determines at the end of each awarded free game whether the symbol array is to be expanded based on a growth condition being satisfied (e.g. appearance of a wild stack occupying an entire column). The processor 204 then randomly determines (e.g. via a RNG call) the symbol array height between a minimum (e.g. 6) and maximum (e.g. 8) number of positions, before the processor 204 evaluates win based on the expanded symbol array (e.g. extending the wild stack to fill the expanded symbol array). In comparison, in the enhanced state, the height of the symbol array, which upon determination by the processor 204 is to be expanded, will expand to the maximum (e.g. 8) number of positions. In other words, the unenhanced state allows for a variable symbol array height across the free games, whereas the enhanced state bypasses the height determination to allow all free games to be played at the maximum height.

Feature 2 (Additional Games and Multipliers—the "Longevity Feature")

Feature 2 (Ft 2) is triggerable based on an assigned trigger probability when SCAT 2 is a selected trigger symbol. When Feature 2 is triggered in an unenhanced state, 5 free games are awarded. During Feature 2, every SCAT 2 symbol that is selected awards 1 free game, 2 free games or a bonus credit prize. These selections are made by the processor 204 from a weight table in memory 208 without replacement such that, for example, once all possible instances of awarding 2 free games have occurred (assuming this happens first), any future occurrences of a SCAT 2 symbol will either result in the award of 1 free game or a bonus credit prize. A multiplier is applied to all line wins during Feature 2. In an example, the value of the multiplier is 3. This multiplier is displayed in the top right corner of the main screen.

In an example, when Feature 2 is in an enhanced or "boosted" state additional free games are awarded. For example, every SCAT 2 symbol that is selected awards 2 free game, 4 free games, or a bonus credit prize. In an example, the multiplier is also higher in the enhanced state. In other examples, rather than doubling the awarded free games, the awardable free games are changed, e.g. so that the weight table includes instances where larger numbers of free games are awarded.

In another example, when Feature 2 is triggered in an unenhanced state, 5 free games are awarded. During Feature 2, every SCAT 2 symbol that is selected awards 1 free game or a bonus credit prize. In the enhanced state, a multiplier is applied to all line wins. In an example, the value of the multiplier is selected by the processor 204 using a weighted table and is either 2 or 3. This multiplier is displayed in the top right corner of the main screen. These selections are made by the processor 204 from a weight table in memory 208 without replacement such that, for example, once all possible instances of awarding a free game have occurred (assuming this happens first), any future occurrences of a SCAT 2 symbol will result in the award of a bonus credit prize. In the enhanced state, the multiplier is also applied to credit values on the coins.

Feature 3 (the "Jackpot Feature")

Feature 3 (Ft 3) is triggerable based on an assigned trigger probability when SCAT 3 is a selected trigger symbol. When Feature 3 is triggered, 10 free games are awarded. SCAT 1, SCAT 2 and SCAT 3 symbols are replaced on the reel strops by a "GOLD SCAT" symbol during this feature. The "GOLD SCAT" symbol is a "configurable symbol" because the symbol is determined or configured dynamically by selecting from a number of possible "configuring symbols"—i.e. a set of symbols that can replace a "GOLD SCAT" symbol or be displayed at the reel strip position on the reel strip where the GOLD SCAT symbol is initially displayed.

Each GOLD SCAT appearing when configured with a configuring symbol reveals either a credit prize or a letter which is a component of at least one of the jackpot prizes. In an example, the letters "M", "I", "N", "A", "J", "O", "R", "G", "N", and "D" correspond to letters that form the prizes GRAND, MAJOR, MINOR, and MINI. In one example, shown in some of the figures described below, there are separate symbols for each of the prizes. In the illustrated example, different colors are used for each prize—e.g. there are three different colored "M" configuring symbols. As described further below, the configuring symbols are selected by a two-stage process of first selecting a weight table, and second selecting a configuring symbol in accordance with the selected weight table.

Any credit prize appearing during the free games is instantly awarded.

Progress toward the award of each awardable prize (such as progressive jackpots, bonus prizes or a mixture of progressive prizes and bonus prizes) is indicated by displaying the names: GRAND, MAJOR, MINOR and MINI with letters yet to have been selected greyed-out and letters that have been selected in color.

If a letter is selected from the reel strips, it is counted towards spelling one of the progressive names. When the name of the progressive is completely collected, the respective progressive is awarded.

In an example, there are tables for each of the "GRAND", "MAJOR", "MINOR", and "MINI" prizes. As described in further detail below the tables are used "without replacement" and contain a set of undetermined, reference letters as well as credit prizes.

For example, the "GRAND" table contains reference letters "Grand_1", "Grand_2", "Grand_3", "Grand_4", and "Grand_5", each with a unique weight. At the start of Feature 3, these reference letters are randomly (even chance) assigned a letter corresponding to the progressive level by processor 204. For example, "Grand_1", "Grand_2", "Grand_3", "Grand_4", and "Grand_5" will be randomly assigned one of "G", "R", "A", "N", or "D", for the remainder of Feature 3.

After any prize is awarded, the progress indicated by the prize name is reset by the processor (here by greying all the letters out) and the prize can potentially be won again during the remainder of the feature. Weight tables are reset if all configurable symbols within the weight table have been used.

In an enhanced state, in one example, letters are not specific to a prize such that a letter shared by two prizes can contribute towards two prizes. For example, if the symbol selection process results in an "M" coin being selected, the processor updates the collection states of both the Mini and Major prizes. In another example, two RNG calls are performed by the processor 204 for the same coin (e.g., first could be a Grand M, second could be a credit prize), to control the probability of letters being collected.

Composite (or "Super") Feature 1 Derived from Feature 1+Feature 2: Ft (1+2)

A number of game play characteristics of Feature 1 are incorporated into Super Feature 1, including that 5 free games are awarded, the number of symbols selected for each column of symbol positions grow, and that additional lines are played. When the feature state of Feature 1 is an unenhanced state, each column of symbol positions grows to 6 symbol positions high and 100 lines are played. When the feature state of Feature 1 is an enhanced state, each column of symbol positions grows to eight symbol positions high and 150 lines are played. Further, if WILD appears in any position on reels 2, 3, 4, and/or 5, the reels are nudged so that all symbols on that reel become WILD. A number of game play characteristics from Feature 2 are incorporated too. Specifically, every SCAT 2 that appears during the feature awards free games or a bonus credit prize. When the feature state of Feature 2 is an unenhanced state, SCAT 2 awards 1 free game, 2 free games or a bonus credit prize as described above Further, a multiplier is applied to all line wins during the feature. When the feature state of Feature 2 is an enhanced state, SCAT 2 awards 2 free games, 4 free games or a bonus credit prize as described above.

Composite (or "Super") Feature 2 Derived from Feature 1+Feature 3: Ft (1+3)

When Super Feature 2 is awarded, 10 free games are awarded (a game play characteristic of Feature 3). SCAT 1, SCAT 2 and SCAT 3 are replaced by GOLD SCAT during this feature (a game play characteristic of Feature 3) and each column grows and more lines are played (a game play characteristic of from Feature 1). As described above the number symbol positions and lines depends on whether the feature state of Feature 1 is in the unenhanced or enhanced state.

As in Feature 1, if WILD appears in any position on reels 2, 3, 4 and/or 5, the reels are nudged so that all symbols on that reel become WILD. Further, line wins are multiplied by 3.

As in Feature 3, each GOLD SCAT appearing has a configuring symbol which is either a credit prize or a letter from "M", "I", "N", "A", "J", "O", "R", "G", "N", "D", which is a component of a prize that can be awarded if all letters are collected in the manner described above. As described above, in the enhanced state letters can contribute to multiple prizes.

Composite (or "Super") Feature 3 Derived from Feature 2+Feature 3: Ft (2+3)

In Super Feature 3, 10 free games are awarded. As described in relation to Feature 3, SCAT 1, SCAT 2 and SCAT 3 are replaced by the configurable symbol GOLD SCAT and each GOLD SCAT appearing is configured by a configuring symbol which is either a credit prize or a letter "M" "I" "N" "A" "J" "O" "R" "G" "N" "D" that is a component of a prize that can be collected. As described above, depending on whether the feature state of Feature 3 is the unenhanced state or the enhanced state the letters either contribute to a single prize or multiple prizes.

As with Feature 2, line wins are multiplied by 3 (a game play characteristic of Feature 2. When the feature state of Feature 2 is an enhanced state, SCAT 2 awards 2 free games, 4 free games or a bonus credit prize as described above.

Composite Feature 4 (or "Mega Feature") Derived from Feature 1, Feature 2 and Feature 3: Ft (1+2+3)

In Mega Feature, 10 free games are awarded. The game play characteristics from Feature 1 are that each column grows 6 and more lines are played. As described above the number symbol positions and lines depends on whether the feature state of Feature 1 is in the unenhanced or enhanced state.

The configurable GOLD SCAT symbol and prize component collection game play characteristics from Feature 3 are incorporated too. As described above, depending on whether the feature state of Feature 3 is the unenhanced state or the enhanced state the letters either contribute to a single prize or multiple prizes.

As in Feature 1, if WILD appears in any position on reels 2, 3 4 and/or 5, the reels are nudged so that all symbols on that reel become WILD. Further, line wins are multiplied and the multiplier is higher in the enhanced state (a game play characteristic of Feature 2).

Figure 6:
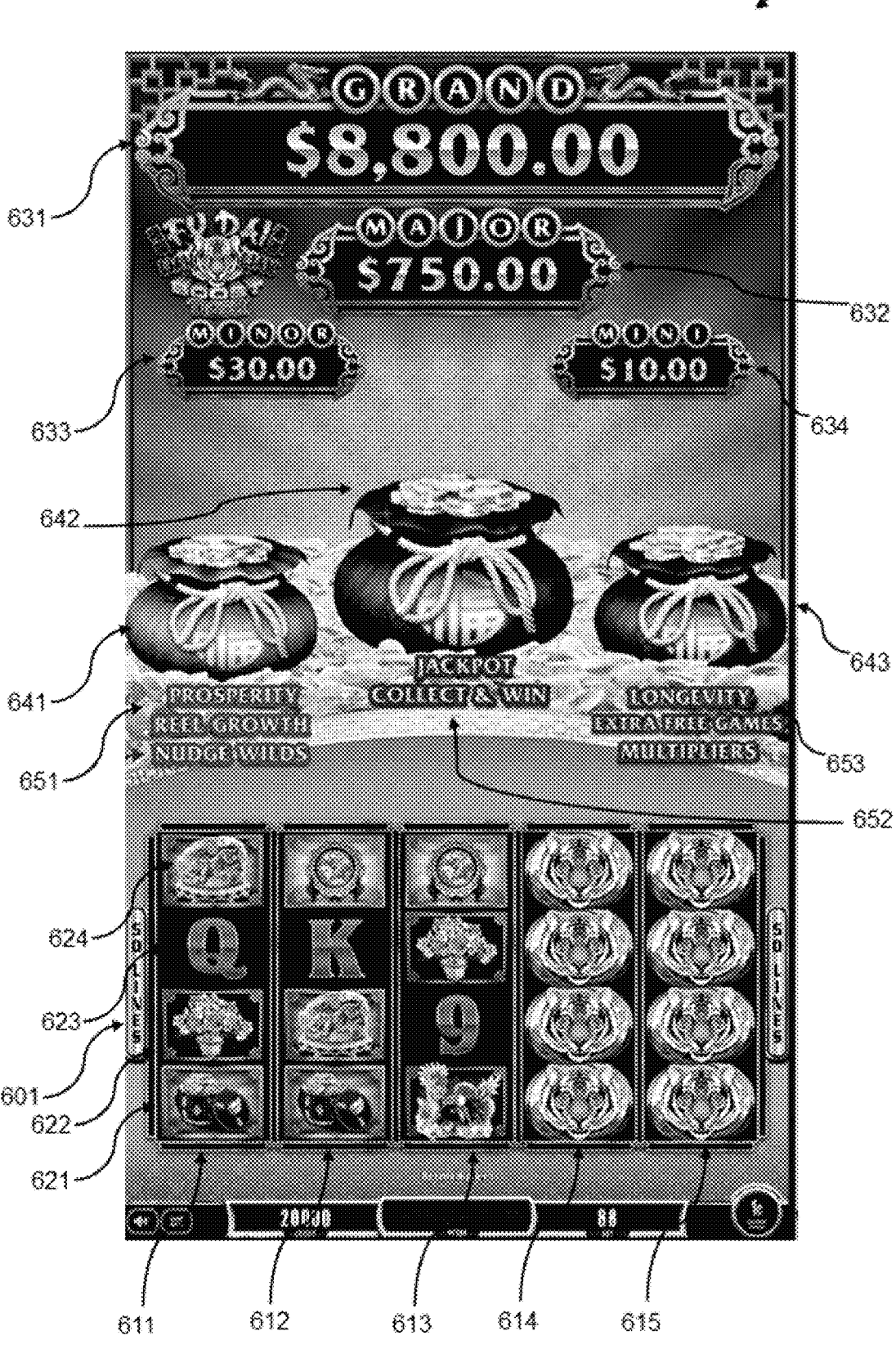
FIGS. 6 and 7 are example screen displays.

FIG. 6 shows an example screen display 600 of the base game. Symbols are selected for twenty symbol positions arranged in five columns 611-615 and four rows 621-624. Screen display has an indicator 601 to indicate that the player is playing 50 lines. In an upper part of the screen display, current values are displayed for a Grand progressive jackpot 631, a Major progressive jackpot 632, a Minor bonus prize 633 and a Mini bonus prize 634, respectively.

In some embodiments, the trigger symbol counters are graphically indicated, instead of or in addition to, being numerically indicated. In the example of FIG. 6, screen display 600 displays bags of coins 641-643 that correspond to the Prosperity Feature 641, Jackpot Feature 642, and Longevity Feature 643. The size of the bag is indicative of how many trigger symbols have appeared and have been counted since the respective feature counter was last reset.

In one example, each bag 641-643 has five possible states corresponding to different graphical representations of the bags as set out in Table 2. In this example, the fifth state also corresponds to the enhanced state of the relevant feature.

TABLE 2

| State of bag | BAG 641 | BAG 642 | BAG 643 |
|---|---|---|---|
| 1 - unenhanced | 0-4 | 0-4 | 0-4 |
| 2 - unenhanced | 5-9 | 5-9 | 5-9 |
| 3 - unenhanced | 10-14 | 10-14 | 10-14 |
| 4 - unenhanced | 15-24 | 15-24 | 15-24 |
| 5 - enhanced | 25+ | 25+ | 25+ |

In the screen display of FIG. 6, feature game play characteristic messages 651, 652, 653 are displayed under the Bags 641-643 corresponding to each of the feature games. FIG. 6 shows each of the Bags in state 1 and the accompanying messages correspond to the unenhanced game play characteristics. Specifically, for Feature 1 ("Prosperity") 641, the game play characteristic message 651 is "Reel Growth, Nudge Wilds". For Feature 2 ("Longevity") 643, the game play characteristic message 653 is "Extra Free Games, Multipliers". For Feature 3 ("Jackpot") 642, the game play characteristic message 652 is "Collect & Win".

Figure 7:
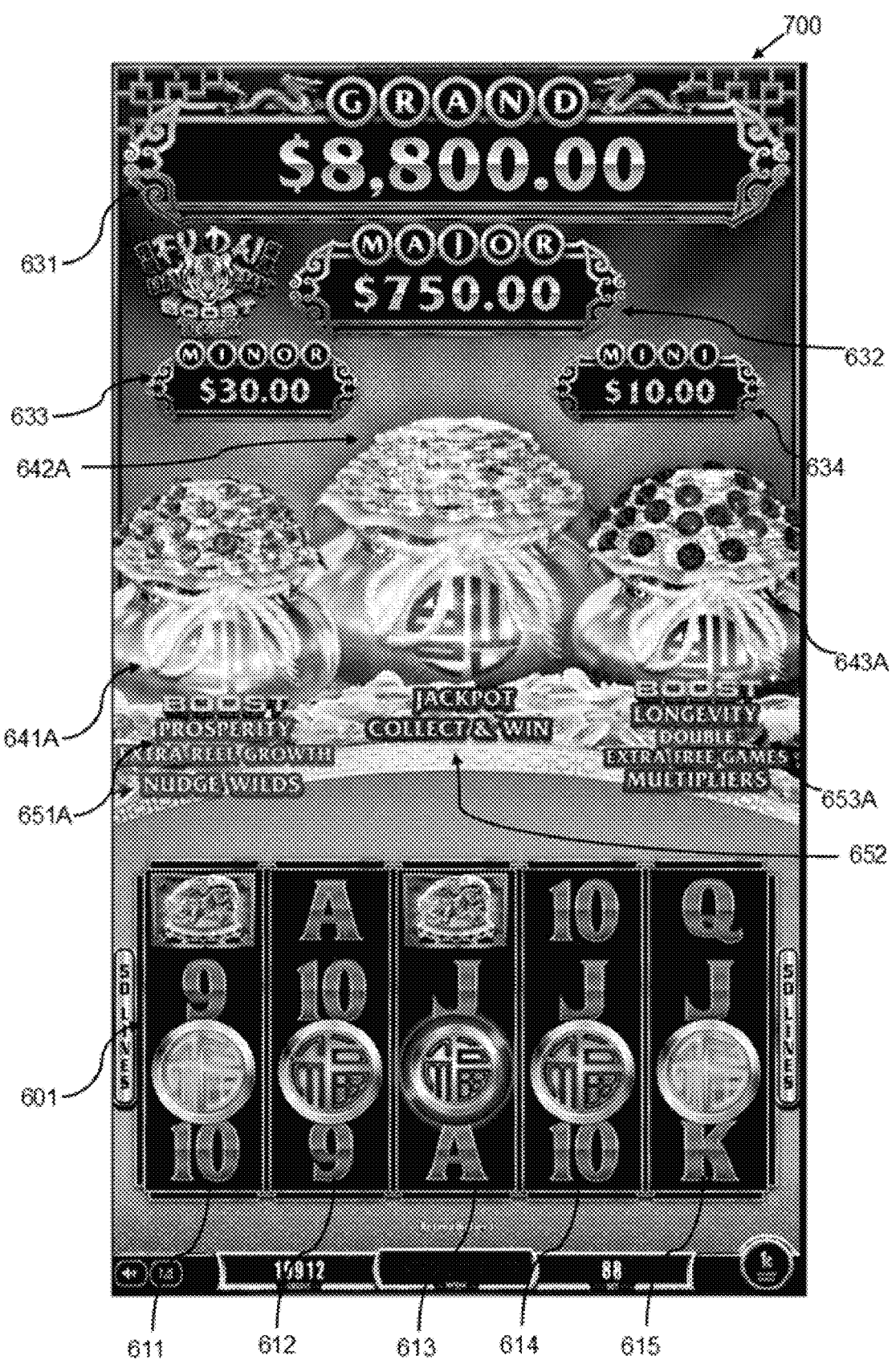

In the screen display of FIG. 7, the states of the bags have changed to new states, respectively. In the example, Bag 642A is in state 4, while Bag 641A and Bag 643A are in state

5. In this respect it will be noted that in addition to the bags growing, jewels are added to Bags 641A, 643A to indicate to the player that this is the highest state corresponding to an enhanced game play characteristic. Game play characteristic messages 651A, 652, 653A are displayed under the bags 641A-643A corresponding to each of the feature games, from which it will be noted that message 652 remains unchanged as this feature is still in an unenhanced state, while the other messages are changed to reflect the enhanced game play characteristic. Specifically, for Feature 1 ("Prosperity"), the updated game play characteristic message 651A is "Extra Reel Growth, Nudge Wilds". The word "Boost" is also added below the bag to communicate that the enhanced game play characteristic is available. For Feature 2 ("Longevity"), the game play characteristic message 653 is "Double Extra Free Games, Multipliers". Again, the word "Boost" is also added below the bag to communicate that the enhanced game play characteristic is available. If Feature 3 ("Jackpot") were in an enhanced state, the game play characteristic message would be "Multi-Collect & Win".

It will be appreciated that there are a number of different ways in which the trigger symbol counters can be updated. In the above example, in case of landing multiple SCATs, the SCATs add to the corresponding bags regardless of whether a feature gets triggered (e.g. if SCAT 1 and SCAT 2 land, and any of Ft1, Ft2 and Ft(1+2) triggers, then both SCAT 1 and SCAT 2 still get added to Bag 1 and Bag 2).

In another example, in the case of landing a single SCAT, the SCAT will add to the corresponding bag only if no feature gets triggered. For example, if SCAT 1 lands, but Ft1 doesn't trigger, then SCAT 1 gets added to the counter for the feature state of Ft 1 (as represented by Bag1).

In another example, in the case of landing a single SCAT, the SCAT will add to the corresponding bag regardless of whether a feature gets triggered (e.g. if SCAT 1 lands, and Ft1 triggers, then SCAT 1 still gets added to Bag 1).

In another example, in the case of landing multiple SCATs, the SCATs add to the corresponding bags only if no feature gets triggered (e.g. if SCAT 1 and SCAT 2 land, but none of Ft1, Ft2, and Ft(1+2) triggers, then SCAT 1 and SCAT 2 get added to Bag 1 and Bag 2).

In another example, in the case of landing multiple SCATs, the SCATs add to the corresponding bags only if a feature corresponding to the feature state does not get triggered (e.g. if SCAT 1 and SCAT 2 land, and if Ft1 triggers, then only SCAT 2 gets added to Bag 2 but if Ft2 triggers, then only SCAT 1 gets added to Bag 1 and if Ft(1+2) triggers, then no SCAT is added to any bag).

Figure 8:
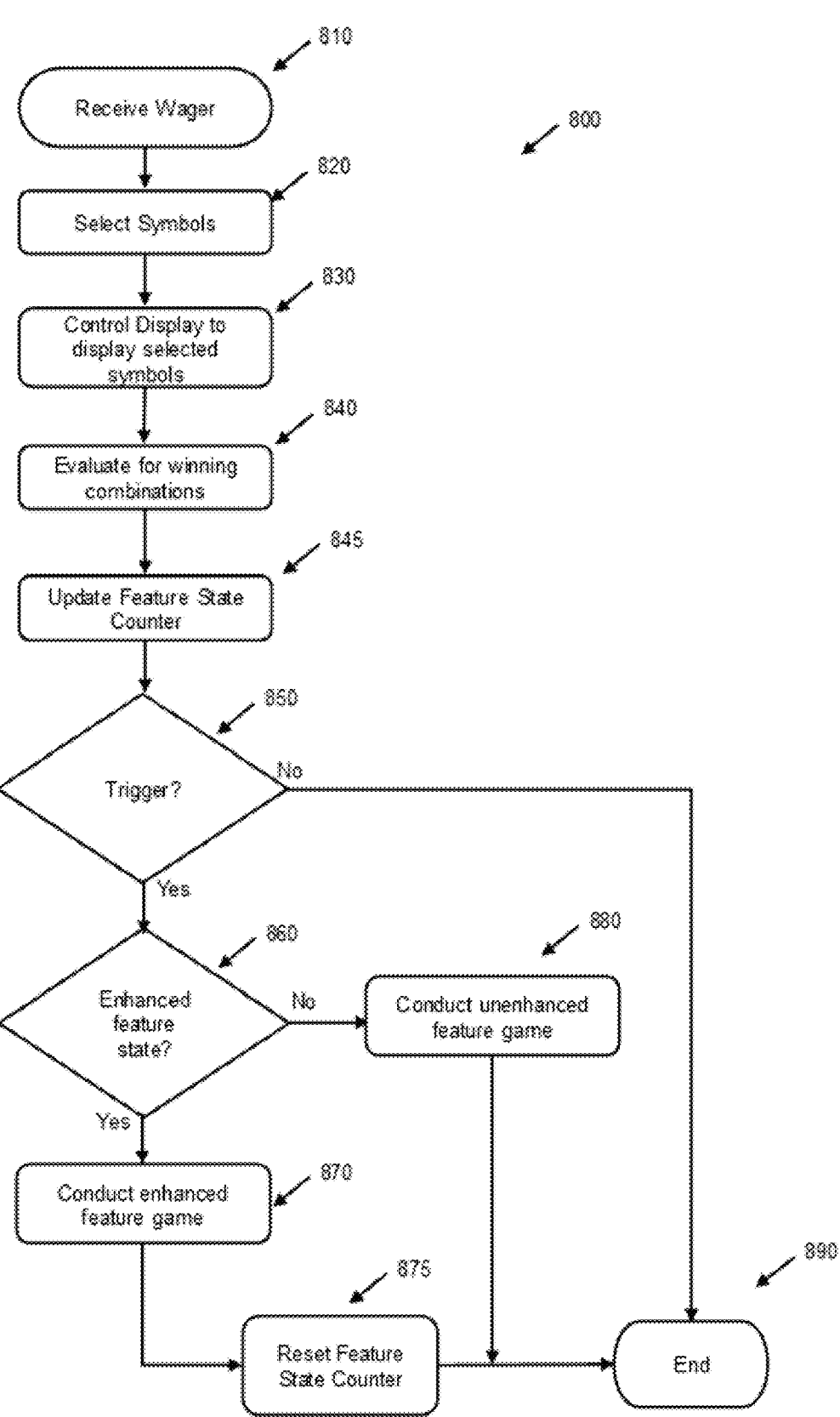
FIG. 8 is a flow chart of another embodiment.

FIG. 8 is a flow chart of a method 800 of operating a gaming device 200 of another embodiment. At step 810, the gaming device 200 receives the player's wager which is input as described above.

At step 820, the processor 204 selects symbols for display on display 240 from reel strips stored in the memory 208, for example, using the process described in relation to FIGS. 3 and 4 above.

After the symbols of all reel strips have been mapped to symbol position, at step 830, the processor 204 controls display 240 to display the selected symbols at the symbol positions.

At step 840, the processor 204 evaluates the selected symbols for winning combinations based on a pay table stored in memory 204. In an example, the processor 204 checks each pay line activated by the player's wager to determine whether it has a winning combination of symbols (e.g. three, four or five of a symbol included in the pay table). In an example, the processor 204 evaluates each pay line from left to right—i.e. the winning combination must start in the left most column. WILD symbols substitute for all other symbols in this evaluation. The processor 204 makes an award for each winning combination based on any selected bet multiplier by adding an award to a win meter stored in memory 208.

At step 850, the processor 204 determines whether the selected symbols satisfy a trigger condition, for example that they include a defined minimum number of trigger symbols. In this respect, it will be appreciated step 540 can be initiated before or after the symbols are displayed.

At step 860, the processor determines whether the feature state is an enhanced state or an unenhanced state. In an example, like the embodiment of FIG. 5, the feature state is dependent on symbols collected. In an example, the feature state is dependent on whether symbols collected by a single player during a game session or since a previous enhanced feature have reached a threshold number. In another example, the counter is not reset at the end of a game session such that a new player can benefit from any accrued progress towards the enhanced feature state.

In this example, the processor 204 updates the feature state counter at step 845 dependent on the number of selected collectable symbols (if any). If the threshold number has been reached, at step 860, the processor 204 will determine that the state of the gaming device 200 is the enhanced feature state and conduct the enhanced feature game at step 870 before resetting the feature state counter at step 875 before the process ends at step 590.

If instead processor 204 determines at step 860 that the state of the gaming device 200 is the unenhanced feature state, processor 204 conducts the unenhanced feature game at step 880 before the process ends at step 590.

Example Embodiments

An example embodiment provides a gaming device comprising: a display; a processor; and a memory storing (a) feature game data defining a feature game having at least one unenhanced game play characteristic corresponding to an unenhanced state of the first feature game, and an enhanced game play characteristic corresponding to an enhanced state of the feature game, (b) a current feature state, and (c) instructions which when executed by the processor cause the processor to: upon one of the feature game being triggered, initiate the feature game with the unenhanced game play characteristic when the feature state is the unenhanced state, and with the enhanced game play characteristic when the feature state is the enhanced state; conduct the initiated feature game; and make any awards resulting from conduct of the initiated feature game.

In an embodiment, the instructions cause the processor to reset the feature state at the end of a game session.

In an embodiment, the instructions cause the processor to reset the feature state responsive to initiating the feature game with the enhanced game play characteristic.

Another example embodiment provides a method of operating a gaming device comprising a display, and a memory storing (a) feature game data defining a feature game having at least one unenhanced game play characteristic corresponding to an unenhanced state of the first feature game, and an enhanced game play characteristic corresponding to an enhanced state of the feature game, and (b) a current feature state, the method comprising: upon one of the feature game being triggered, initiating the feature game with the unenhanced game play characteristic when the feature state is the unenhanced state, and with the enhanced game play characteristic when the feature state is the enhanced state; conducting the initiated feature game; and making any awards resulting from conduct of the initiated feature game.

Another example embodiment provides a system comprising: one or more processors; and at least one memory storing (a) feature game data defining a feature game having at least one unenhanced game play characteristic corresponding to an unenhanced state of the first feature game, and an enhanced game play characteristic corresponding to an enhanced state of the feature game, (b) a current feature state, and (c) instructions which when executed by the one or more processors, cause the one or more processors to: upon one of the feature game being triggered, initiate the feature game with the unenhanced game play characteristic when the feature state is the unenhanced state, and with the enhanced game play characteristic when the feature state is the enhanced state; conduct the initiated feature game; and make any awards resulting from conduct of the initiated feature game.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

at least one server storing a return-to-player and a plurality of composite weight tables, each of the composite weight tables listing a plurality of weight values assigned to triggering one or more of a plurality of feature games; and a remote gaming device, coupled to the at least one server, comprising a processor and a memory storing data tracking a first feature game having a first unenhanced state and a first unenhanced game characteristic, a second feature game having a second unenhanced state and a second unenhanced game characteristic, feature states and feature state counters for the first feature game and the second feature game, a pay table, and instructions, which, when executed, cause the processor to at least:

receive, from the at least one server, data indicative of a first composite weight table and the return-to-player, cause the remote gaming device to display a plurality of symbols randomly selected based on a random number generated from a random number generator and the weight values in the first composite weight table received to maintain the return-to-player, cause the remote gaming device to trigger one feature game among the first feature game, the second feature game, and a composite feature game formed from the first feature game and the second feature game, when the symbols displayed include a trigger symbol, update one or more of the feature states and one or more of the feature state counters based on the triggering of the one feature game, in response to the one feature game triggered being the composite feature game, and the one or more feature state counters having reached a first threshold for the first unenhanced state, cause the remote gaming device to initiate the one feature game based on a first feature state that the first feature game is currently in, to control a display device of the remote gaming device to visually transition the first unenhanced state having the first unenhanced game characteristic to a first enhanced state having a first enhanced game characteristic, and to control the display device of the remote gaming device to visually incorporate, into the composite feature game, composite game characteristics formed from the first enhanced game characteristic, and the second feature game with either the second unenhanced game characteristic, or a second enhanced game characteristic, and access the memory for the pay table to determine a win in the one feature game.

2. The electronic gaming system of claim 1, wherein the instructions, when executed, cause the processor to: when the first unenhanced game characteristic includes awarding a plurality of free games, increase the plurality of free games; when the first unenhanced game characteristic includes awarding a plurality of pay lines, increase the plurality of pay lines; when the first unenhanced game characteristic includes awarding a plurality of additional display positions, increase the plurality of additional display positions; when the first unenhanced game characteristic includes awarding a multiplier, increase the multiplier; and when the first unenhanced game characteristic includes awarding a configuring symbol for one of a first prize and a second prize, update the configuring symbol to be awardable for both the first prize and the second prize.

3. The electronic gaming system of claim 1, wherein the instructions, when executed, cause the processor to, when the first feature game uses a first weight table for awards in the first unenhanced state, use a different first weight table for different larger awards for the first enhanced state.

4. The electronic gaming system of claim 3, wherein the instructions, when executed, cause the processor to return from using the different first weight table to using the first weight table when all entries in the different first weight table have been selected.

5. The electronic gaming system of claim 1, wherein when the first feature game is triggered, and the instructions, when executed, cause the processor to initiate the first feature game with the first unenhanced game characteristic when the first feature game is in the first unenhanced state, and initiate the first feature game with the first unenhanced game characteristic when the first feature game is in the first enhanced state.

6. The electronic gaming system of claim 5, wherein the instructions, when executed, cause the processor to increment a first game event counter in response to an occurrence of a first game event in the first feature game, advance the first feature game from the first unenhanced state to the first enhanced state upon the first game event counter reaching the first threshold, and reset the first game event counter upon either the first feature game being conducted with the first unenhanced game characteristic or the composite feature game being conducted with the first unenhanced game characteristic.

7. The electronic gaming system of claim 1, wherein the instructions, when executed, cause the processor to, during the first feature game:

cause a plurality of columns of display positions to display the plurality of symbols selected, wherein each column of display positions corresponds to a reel strip of a plurality of reel strips;

upon the plurality of symbols selected comprising one or both of a first trigger symbol corresponding to the first feature game and a second trigger symbol corresponding to the second feature game, assign at least one trigger probability of a plurality of trigger probabilities based on identities of the one or both of the first trigger symbol and the second trigger symbol selected;

determine a trigger outcome based on the at least one trigger probability assigned; and initiate the one feature game based on the trigger outcome, wherein the one feature game comprises the first feature game, the second feature game and the composite feature game.

8. A method of configuring a prize in an electronic gaming system comprising a remote gaming device, coupled to at least one server, the method comprising:

transmitting, from the at least one server to the remote gaming device, data indicative of a first composite weight table listing a plurality of weight values assigned to triggering one or more of a plurality of feature games, and data for maintaining a return-to-player;

controlling a processor of the remote gaming device to track feature states and feature state counters for a first feature game and a second feature game;

controlling the remote gaming device to display a plurality of symbols selected based on a random number generated from a random number generator and the weight values in the first composite weight table received;

controlling the remote gaming device to trigger one feature game among the first feature game, the second feature game, and a composite feature game formed from the first feature game and the second feature game, when the symbols displayed include a trigger symbol;

controlling the remote gaming device to update one or more of the feature states and one or more of the feature state counters based on the triggering of the one feature game;

in response to the one feature game triggered being the composite feature game, and the one or more feature state counters having reached a first threshold for a first unenhanced state, controlling the remote gaming device to initiate the one feature game based on a first feature state that the first feature game is currently in, to control a display device of the remote gaming device to visually transition the first unenhanced state having a first unenhanced game characteristic to a first enhanced state having a first enhanced game characteristic, and to control the display device of the remote gaming device to visually incorporate, into the composite feature game, composite game characteristics from the first enhanced game characteristic, and the second feature game with either a second unenhanced game characteristic, or a second enhanced game characteristic; and controlling the remote gaming device to animate a win in the one feature game derived from a pay table.

9. The method of claim 8, further comprising when the first unenhanced game characteristic includes awarding a plurality of free games, increasing the plurality of free games; when the first unenhanced game characteristic includes awarding a plurality of pay lines, increasing the plurality of pay lines; when the first unenhanced game characteristic includes awarding a plurality of additional display positions, increasing the plurality of additional display positions; when the first unenhanced game characteristic includes awarding a multiplier, increasing the multiplier; and when the first unenhanced game characteristic includes awarding a configuring symbol for one of a first prize and a second prize, updating the configuring symbol to be awardable for both the first prize and the second prize.

10. The method of claim 8, further comprising, when the first feature game uses a first weight table for awards in the first unenhanced state, accessing a different first weight table for different larger awards for the first enhanced state.

11. The method of claim 10, further comprising returning from using the different first weight table to using the first weight table when all entries in the different first weight table have been selected.

12. The method of claim 8, further comprising, when the first feature game is triggered, initiating the first feature game with the first unenhanced game characteristic when the first feature game is in the first unenhanced state, and initiating the first feature game with the first unenhanced game characteristic when the first feature game is in the first enhanced state.

13. The method of claim 12, further comprising incrementing a first game event counter in response to an occurrence of a first game event in the first feature game, advancing the first feature game from the first unenhanced state to the first enhanced state upon the first game event counter reaching the first threshold, and resetting the first game event counter upon either the first feature game being conducted with the first unenhanced game characteristic or the composite feature game being conducted with the first unenhanced game characteristic.

14. A non-transitory computer-readable medium comprising a plurality of instructions in a remote gaming device that comprises a processor, the remote gaming device being networked to at least one server, the at least one server, and the instructions, which, when executed, cause the processor to perform the steps of:

receiving, from the at least one server, data indicative of a first composite weight table listing a plurality of weight values assigned to triggering one or more of a plurality of feature games and data for maintaining a return-to-player;

tracking feature states and feature state counters for a first feature game and a second feature game;

animating on the remote gaming device a plurality of symbols selected based on a random number generated from a random number generator and the weight values in the first composite weight table received to maintain the return-to-player;

triggering one feature game among the first feature game, the second feature game, and a composite feature game formed from the first feature game and the second feature game, when the symbols displayed include a trigger symbol on the remote gaming device;

updating one or more of the feature states and one or more of the feature state counters based on the triggering of the one feature game;

in response to the one feature game triggered being the composite feature game, and the one or more feature state counters having reached a first threshold for a first unenhanced state, initiating the one feature game based on a first feature state that the first feature game is currently in, controlling a display device of the remote gaming device to visually transition the first unenhanced state having a first unenhanced game characteristic to a first enhanced state having a first enhanced game characteristic, and controlling the display device of the remote gaming device to visually incorporate, into the composite feature game, composite game characteristics formed from the first enhanced game characteristic, and the second feature game with either a second unenhanced game characteristic, or a second enhanced game characteristic; and animating a win in the one feature game based on a pay table.

15. The non-transitory computer-readable medium of claim 14, and wherein the instructions, when executed, further cause the processor to perform the steps of: when the first unenhanced game characteristic includes awarding a plurality of free games, increasing the plurality of free games; when the first unenhanced game characteristic includes awarding a plurality of pay lines, increasing the plurality of pay lines; when the first unenhanced game characteristic includes awarding a plurality of additional display positions, increasing the plurality of additional display positions; when the first unenhanced game characteristic includes awarding a multiplier, increasing the multiplier; and when the first unenhanced game characteristic includes awarding a configuring symbol for one of a first prize and a second prize, updating the configuring symbol to be awardable for both the first prize and the second prize.

16. The non-transitory computer-readable medium of claim 14, and wherein the instructions, when executed, further cause the processor to perform the step of, when the first feature game uses a first weight table for awards in the first unenhanced state, accessing a different first weight table for different larger awards for the first enhanced state.

17. The non-transitory computer-readable medium of claim 16, and wherein the instructions, when executed, further cause the processor to perform the step of returning from using the different first weight table to using the first weight table when all entries in the different first weight table have been selected.

18. The non-transitory computer-readable medium of claim 17, and wherein the instructions, when executed, further cause the processor to perform the steps of initiating the first feature game with the first unenhanced game characteristic when the first feature game is in the first unenhanced state, and initiating the first feature game with the first unenhanced game characteristic when the first feature game is in the first enhanced state.

19. The non-transitory computer-readable medium of claim 18, and wherein the instructions, when executed, further cause the processor to perform the steps of incrementing a first game event counter in response to an occurrence of a first game event in the first feature game, advancing the first feature game from the first unenhanced state to the first enhanced state upon the first game event counter reaching the first threshold, and resetting the first game event counter upon either the first feature game being conducted with the first unenhanced game characteristic or the composite feature game being conducted with the first unenhanced game characteristic.

20. The non-transitory computer-readable medium of claim 14, and wherein the instructions, when executed during the first feature game, further cause the processor to perform the steps of:

causing a plurality of columns of display positions to display the plurality of symbols selected, wherein each column of display positions corresponds to a reel strip of a plurality of reel strips;

upon the plurality of symbols selected comprising one or both of a first trigger symbol corresponding to the first feature game and a second trigger symbol corresponding to the second feature game, assigning at least one trigger probability of a plurality of trigger probabilities based on identities of the one or both of the first trigger symbol and the second trigger symbol selected;

determining a trigger outcome based on the at least one trigger probability assigned; and initiating the one feature game based on the trigger outcome, wherein the one feature game comprises the first feature game, the second feature game and the composite feature game.

* * * * *